United States Patent
Zeng

(10) Patent No.: US 7,304,766 B2
(45) Date of Patent: Dec. 4, 2007

(54) METHOD AND APPARATUS FOR DATA ADJUSTMENT

(75) Inventor: Huanzhao Zeng, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1017 days.

(21) Appl. No.: 10/114,648

(22) Filed: Apr. 1, 2002

(65) Prior Publication Data

US 2003/0193677 A1    Oct. 16, 2003

(51) Int. Cl.
H04N 1/00 (2006.01)
G03F 3/00 (2006.01)

(52) U.S. Cl. ............ 358/1.9; 358/500; 358/501; 358/518; 358/525; 382/162; 382/167; 382/300; 345/601; 345/602; 345/603; 345/604

(58) Field of Classification Search .......... 358/1.9, 358/525, 501, 518; 382/300, 167; 345/601, 345/602, 604

See application file for complete search history.

(56) References Cited

U.S. PATENT DOCUMENTS

| | | | | |
|---|---|---|---|---|
| 5,289,295 A * | 2/1994 | Yumiba et al. | ............ | 358/518 |
| 5,500,921 A * | 3/1996 | Ruetz | ............ | 358/1.9 |
| 5,596,428 A * | 1/1997 | Tytgat et al. | ............ | 358/518 |
| 5,619,427 A * | 4/1997 | Ohkubo | ............ | 358/523 |
| 5,696,839 A * | 12/1997 | Siegeritz | ............ | 382/162 |
| 5,737,032 A * | 4/1998 | Stenzel et al. | ............ | 348/649 |
| 5,909,291 A * | 6/1999 | Myers et al. | ............ | 358/523 |
| 5,937,089 A * | 8/1999 | Kobayashi | ............ | 382/167 |
| 5,963,201 A * | 10/1999 | McGreggor et al. | ............ | 715/722 |
| 6,108,008 A * | 8/2000 | Ohta | ............ | 345/590 |
| 6,275,302 B1 | 8/2001 | Coleman | ............ | 358/1.9 |
| 6,304,863 B1 * | 10/2001 | Murai | ............ | 706/15 |
| 6,330,078 B1 * | 12/2001 | Wang | ............ | 358/1.9 |
| 6,362,808 B1 * | 3/2002 | Edge et al. | ............ | 345/601 |
| 6,421,140 B1 * | 7/2002 | Hui | ............ | 358/1.9 |
| 6,611,356 B1 * | 8/2003 | Shimizu et al. | ............ | 358/1.9 |
| 6,628,825 B1 * | 9/2003 | Yamazoe et al. | ............ | 382/167 |
| 6,701,007 B1 * | 3/2004 | Yamaguchi | ............ | 382/162 |
| 6,731,796 B2 * | 5/2004 | Maltz et al. | ............ | 382/167 |
| 6,999,617 B1 * | 2/2006 | Ohga | ............ | 382/167 |
| 7,006,691 B2 * | 2/2006 | Muramoto | ............ | 382/167 |
| 2002/0000993 A1 * | 1/2002 | Deishi et al. | ............ | 345/590 |
| 2003/0090726 A1 * | 5/2003 | Arai | ............ | 358/2.1 |
| 2005/0057762 A1 * | 3/2005 | Yoshida et al. | ............ | 358/1.9 |
| 2005/0062985 A1 * | 3/2005 | Lammens et al. | ............ | 358/1.9 |
| 2005/0083542 A1 * | 4/2005 | Jacob | ............ | 358/1.9 |
| 2006/0188156 A1 * | 8/2006 | Kwak et al. | ............ | 382/167 |

FOREIGN PATENT DOCUMENTS

JP 02000253269 A * 9/2000
WO WO99/20036 4/1999

OTHER PUBLICATIONS

British Search Report dated Aug. 27, 2003.
Hewlett-Packard Company patent application; U.S. Appl. No. 09/843,406; titled "Color Space Transformation With Black Preservation For Open Color Management"; filed on Apr. 26, 2001.
Hewlett-Packard Company patent application; U.S. Appl. No. 09/773,478; titled "System And Method For Gamut Mapping Using A Composite Color Space"; filed on Jan. 31, 2001.
Hewlett-Packard Company patent application; U.S. Appl. No. 10/004,009; titled "Method And System For Management Of Color Through Conversion Between Color Spaces"; filed on Oct. 29, 2001.

* cited by examiner

Primary Examiner—Aung S. Moe
Assistant Examiner—Beniyam Menberu
(74) Attorney, Agent, or Firm—Gregg W. Wisdom

(57) ABSTRACT

A method includes obtaining a first value corresponding to a first location in a first color space and obtaining a second value in a second color space using the first value. The method further includes converting the second value to a third value in the first color space corresponding to a second location in the first color space and determining a fourth value related to a distance between the first location and the second location. Additionally, the method includes changing the second value if the fourth value exceeds the predetermined value.

36 Claims, 10 Drawing Sheets

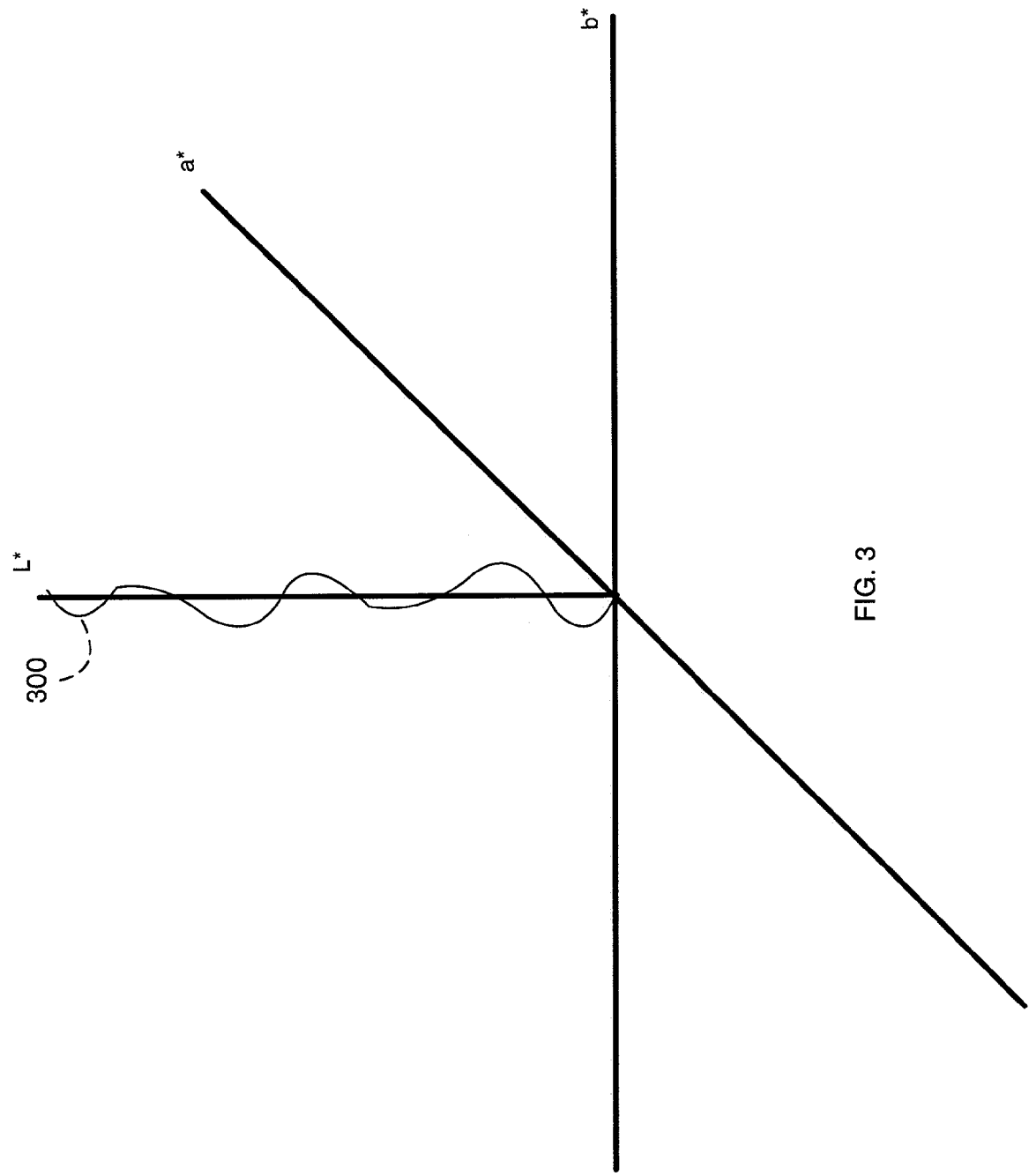

METHOD AND APPARATUS FOR DATA ADJUSTMENT

INTRODUCTION

To improve the accuracy of color reproduction between devices, the International Color Consortium (ICC) has developed a technique for the conversion of color data between devices making use of different types of color spaces. The technique includes the designation of an intermediate color space used between a source device and a destination device. The intermediate color space permits conversion between the source color space and the destination color space without the source device having information about the destination color space and without the destination device having information about the source color space. However, the source device and the destination device have information that permits conversion, respectively, to the intermediate color space and from the intermediate color space.

By handling the color space conversion between the source device and the destination device in this manner, color space conversion can be accurately accomplished between devices configured to perform conversion to or from (as appropriate) the intermediate color space. The intermediate color space defines a profile connection space (PCS). The intermediate color space forming the PCS can include, for example, the CIE XYZ color space or the CIE L*a*b* color space.

Human visual perception is capable of detecting shifts away from the neutral gray color that are small in magnitude relative to the magnitude of shifts of color that are necessary to be detectable in other regions of the color gamut. What is regarded as the desirable gray varies between individuals. Some prefer that the gray is slightly bluish so that the desired gray is shifted in color from the neutral gray (which corresponds to the luminance axis in an L*a*b* color space). The conversion from the intermediate color space to the destination color space can be done through an interpolation process. Errors in the conversion of color data, corresponding to colors in the gray region of the color gamut, from the source device to the destination device can impact the perceived quality of an image formed on media.

SUMMARY OF THE INVENTION

A method includes obtaining a first value corresponding to a first location in a first color space and obtaining a second value in a second color space using the first value. The method further includes converting the second value to a third value in the first color space corresponding to a second location in the first color space and determining a fourth value related to a distance between the first location and the second location. Additionally, the method includes changing the second value if the fourth value exceeds the predetermined value.

BRIEF DESCRIPTION OF THE DRAWINGS

A more thorough understanding of embodiments of the data adjustment method and embodiments of the data adjustment apparatus may be had from consideration of the following detailed description taken in conjunction with the accompanying drawings in which:

Shown in FIG. 1A is a high level block diagram of a first system that can make use of embodiments of the data adjustment system to form images on media.

Figure 1A:
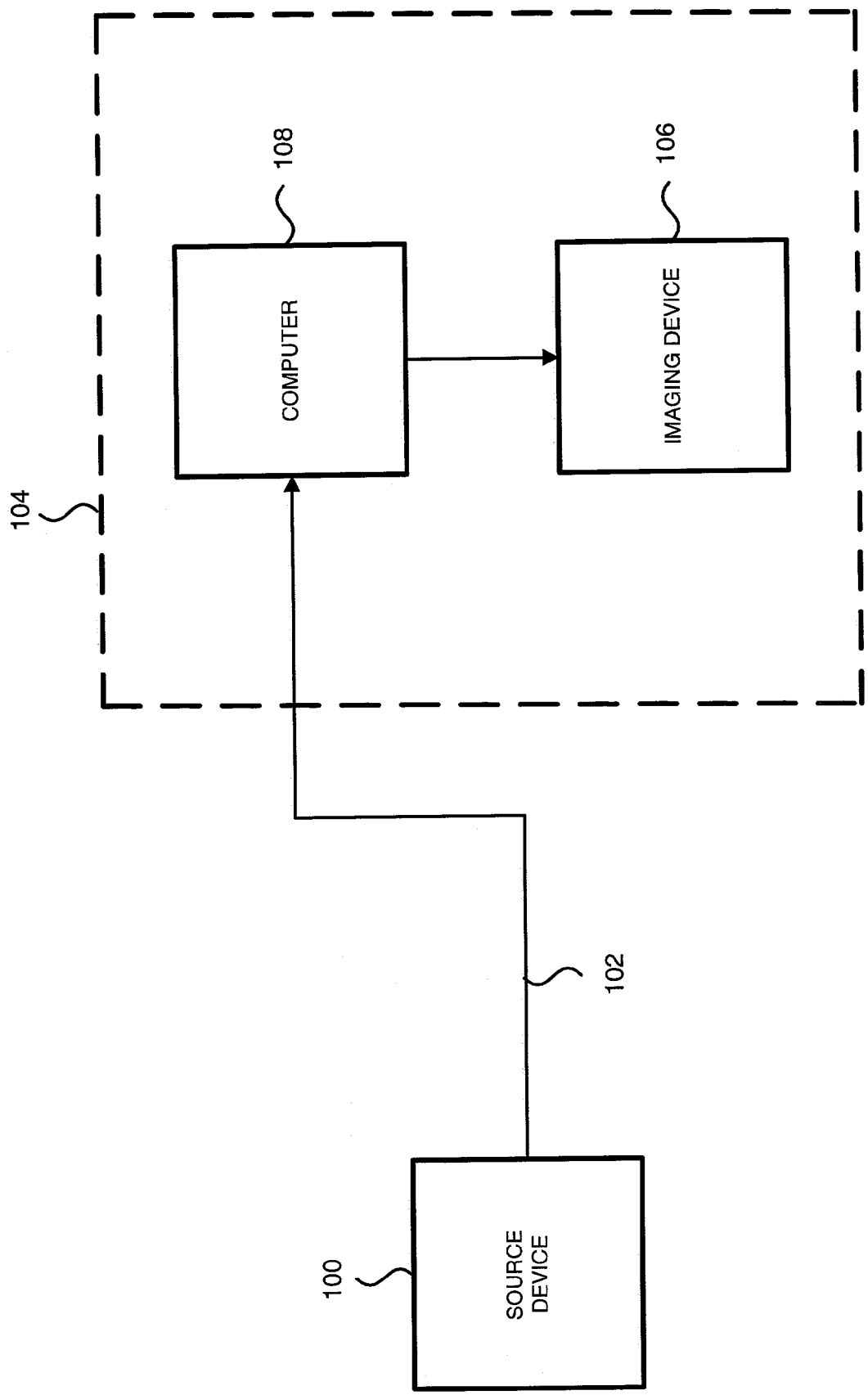
Figure 1B:
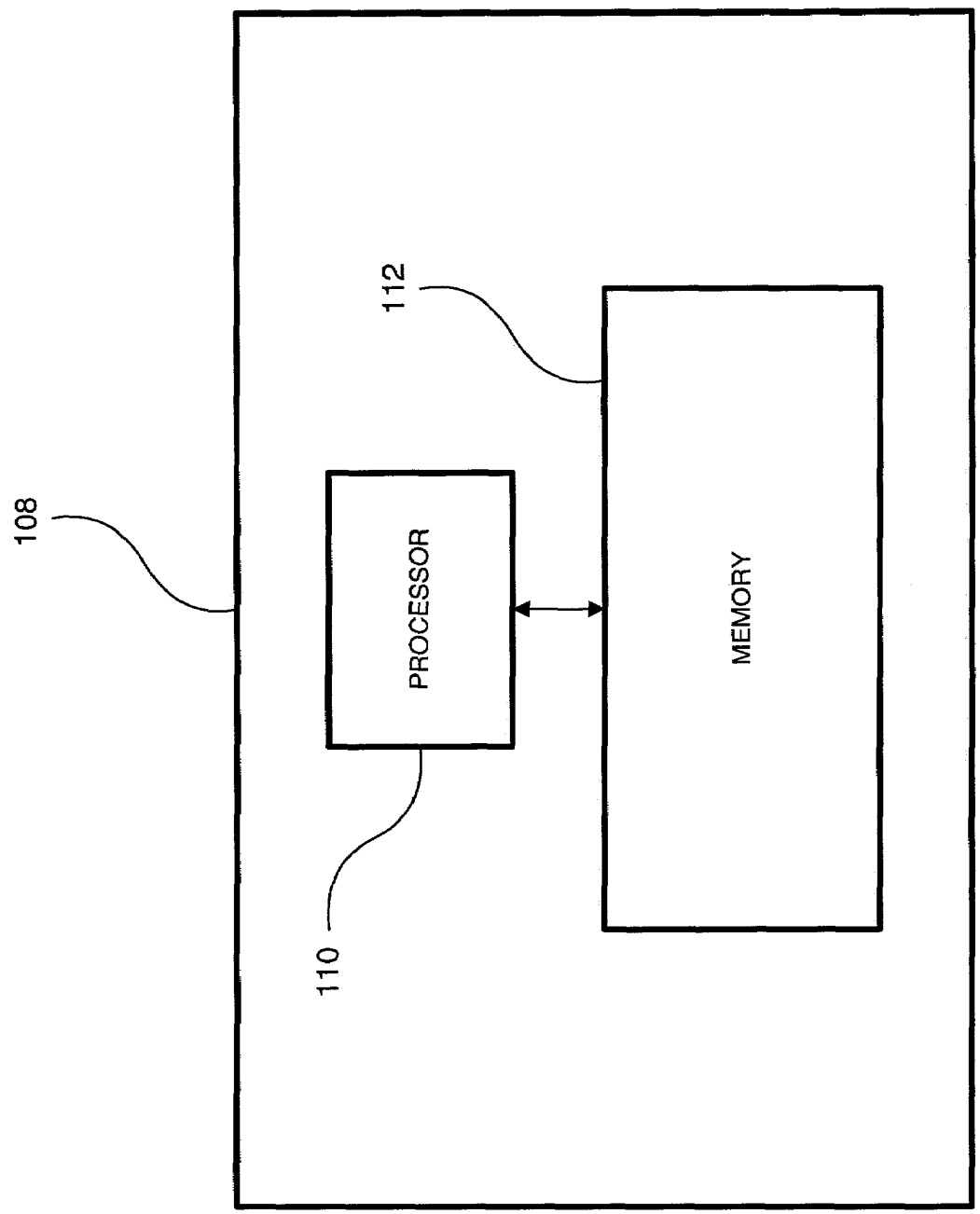

Shown in FIG. 1B is a simplified block diagram of an embodiment of a computer.

Figure 2A:
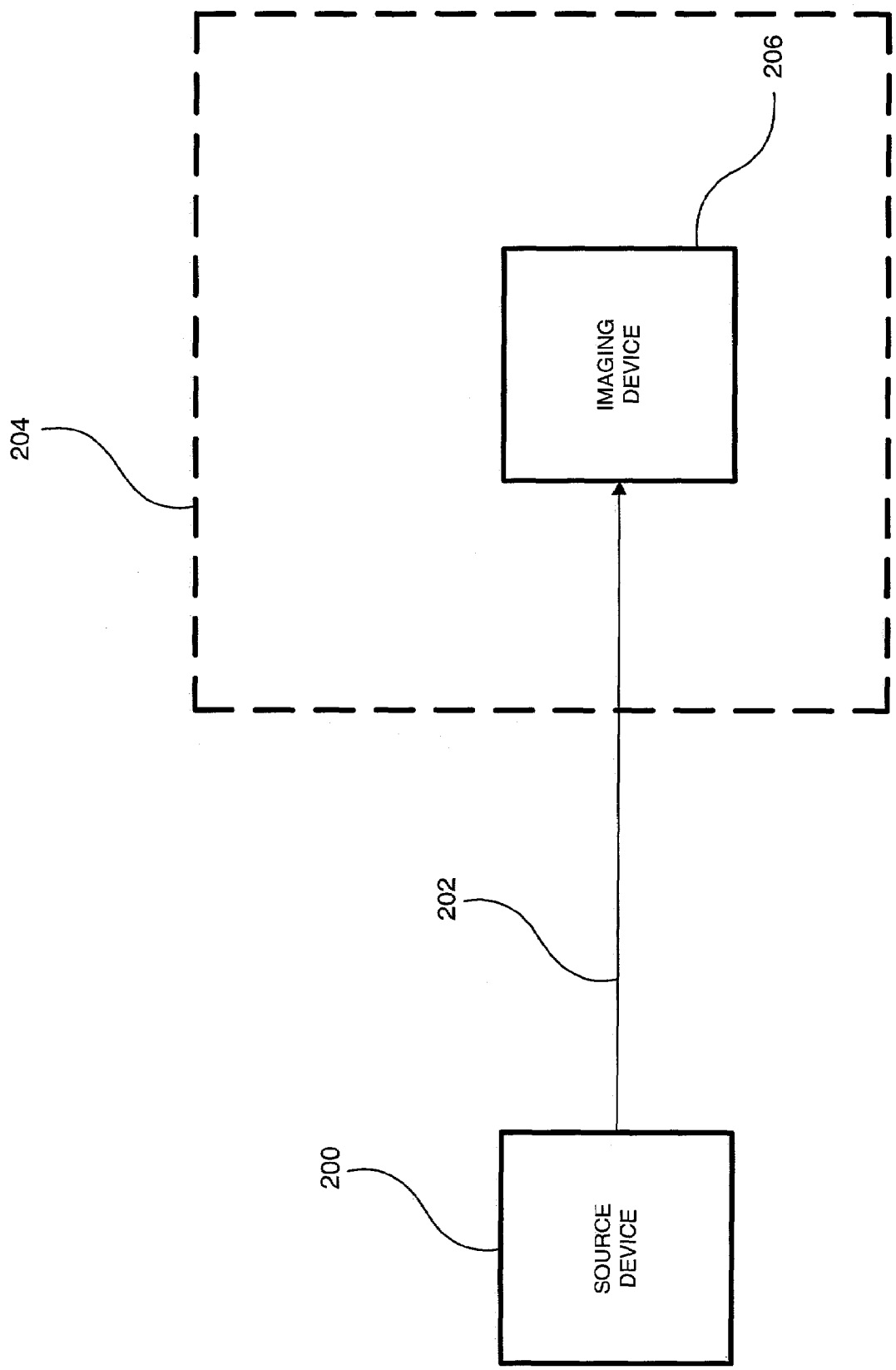

Shown in FIG. 2A is a high level block diagram of a second system that can make use of embodiments of the data adjustment system to form images on media.

Figure 2B:
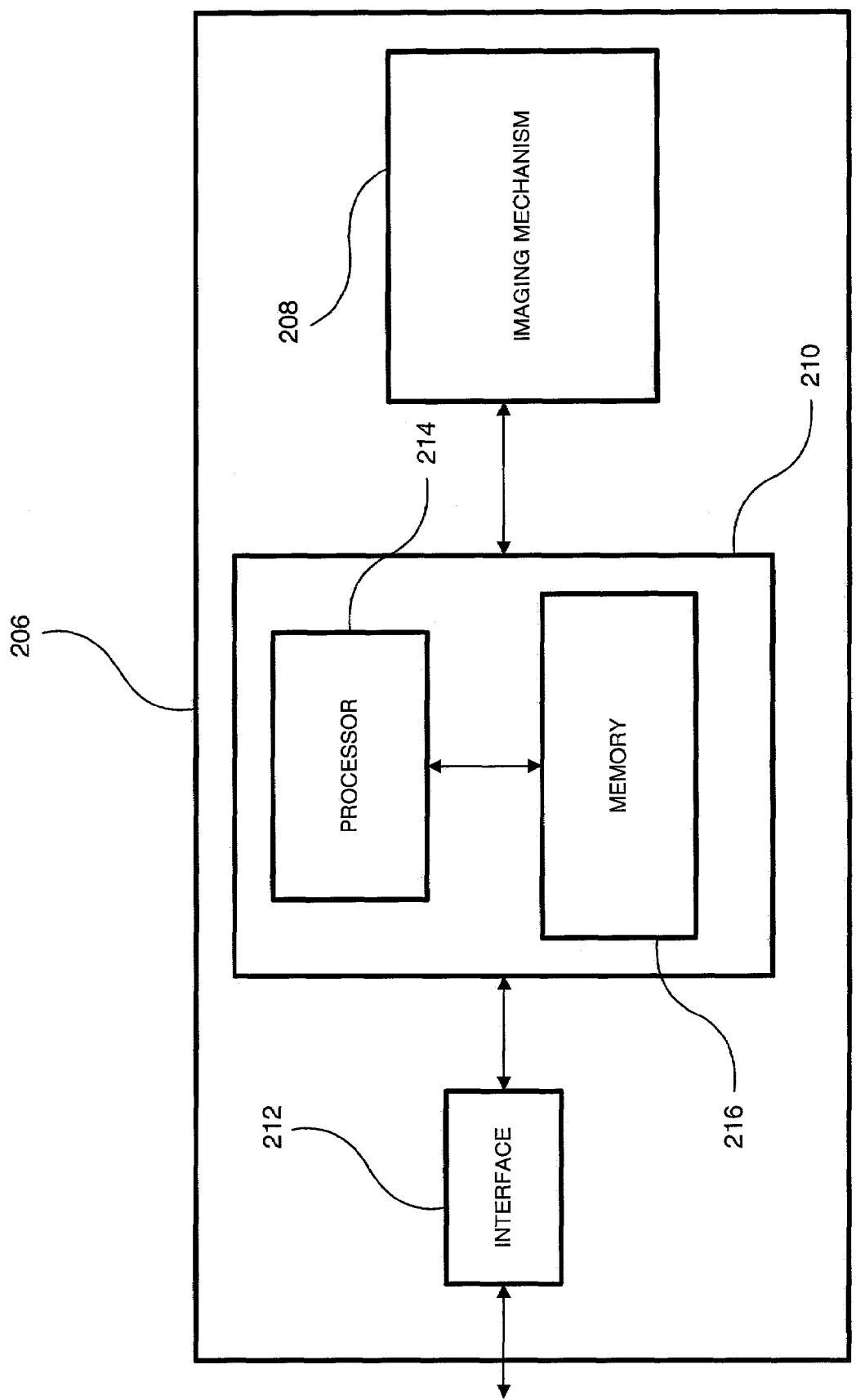

Shown in FIG. 2B is a simplified block diagram of an embodiment of an imaging device.

Shown in FIG. 3 is a representation of an exemplary variation of the color around the L* axis.

Figure 4:
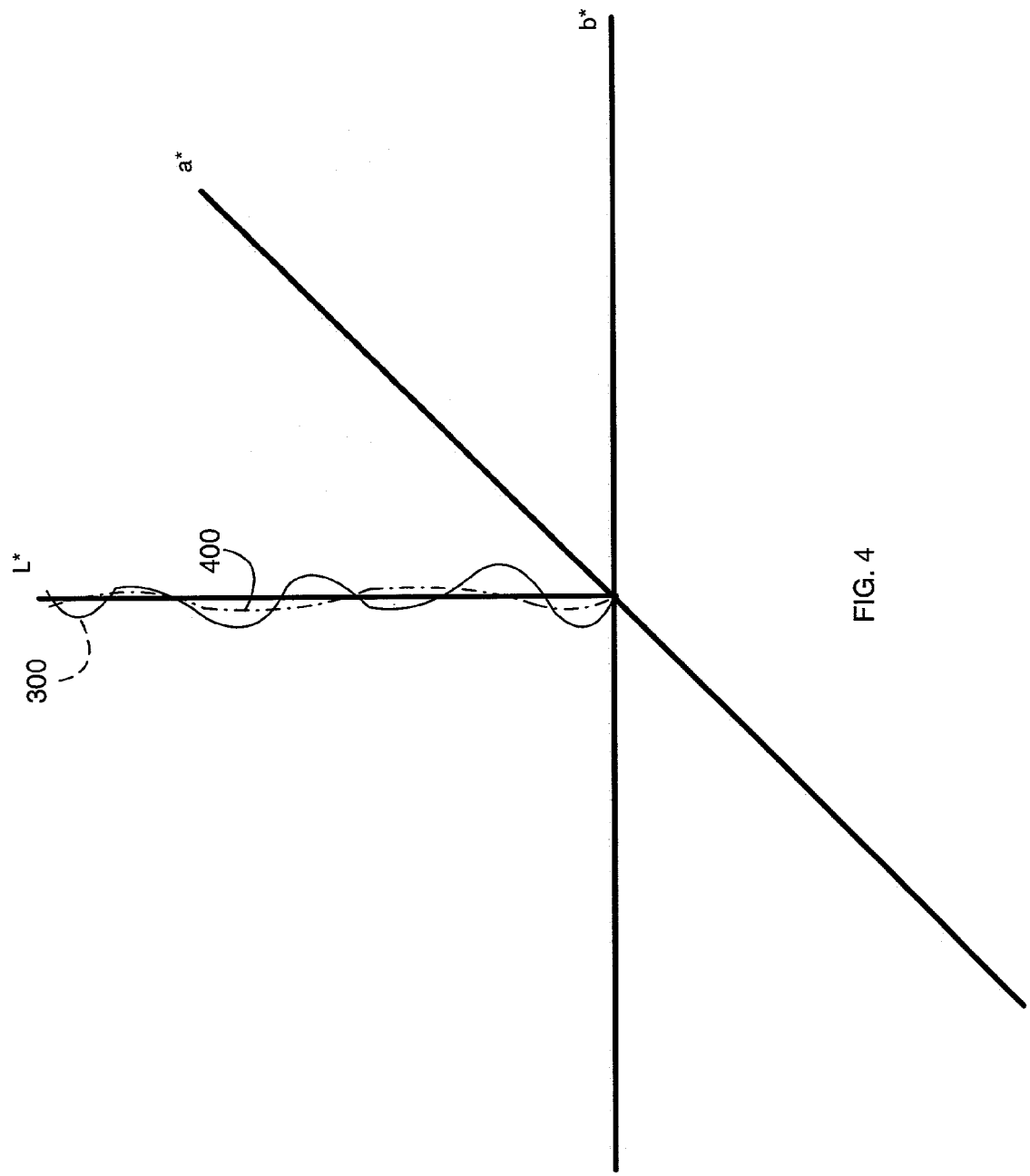

Shown in FIG. 4 is a representation of an exemplary variation of the color around the L* axis after application of an embodiment of the adjustment method.

Figure 5:
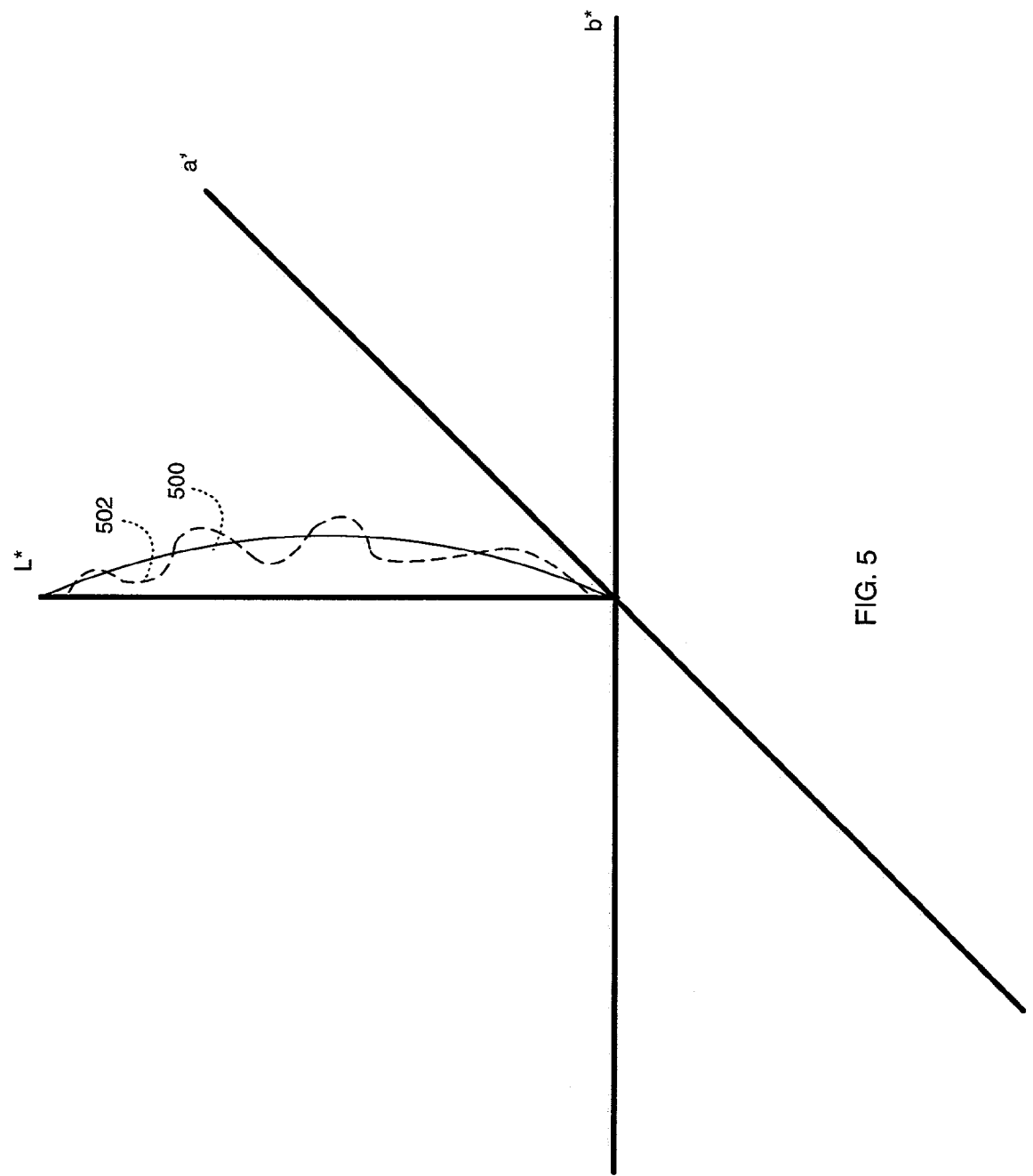

Shown in FIG. 5 is a representation of an exemplary color trajectory and exemplary variation of color around the color trajectory.

Figure 6:
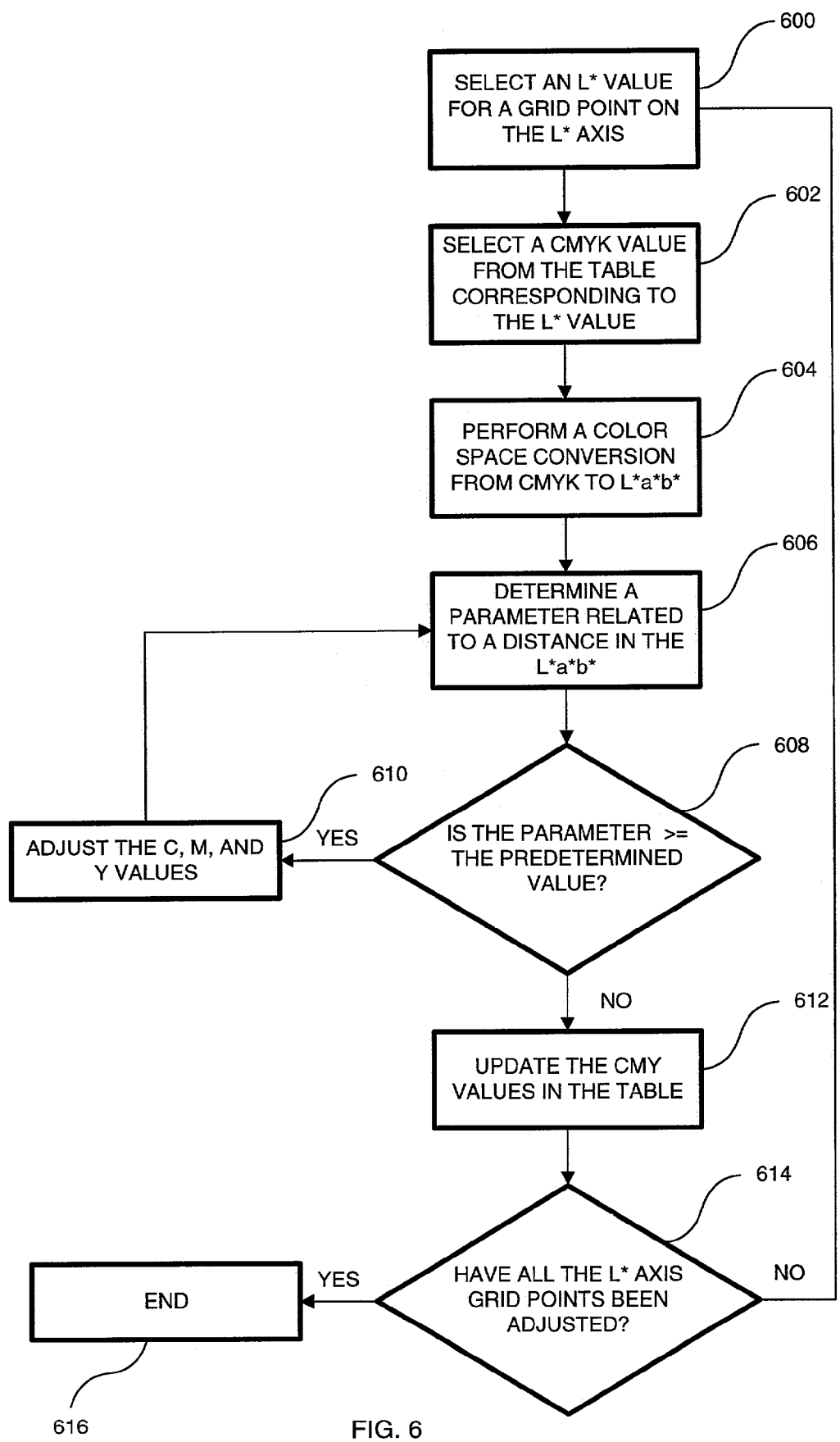

Shown in FIG. 6 is a high-level flow diagram of a first embodiment of a data adjustment method.

Figure 7:
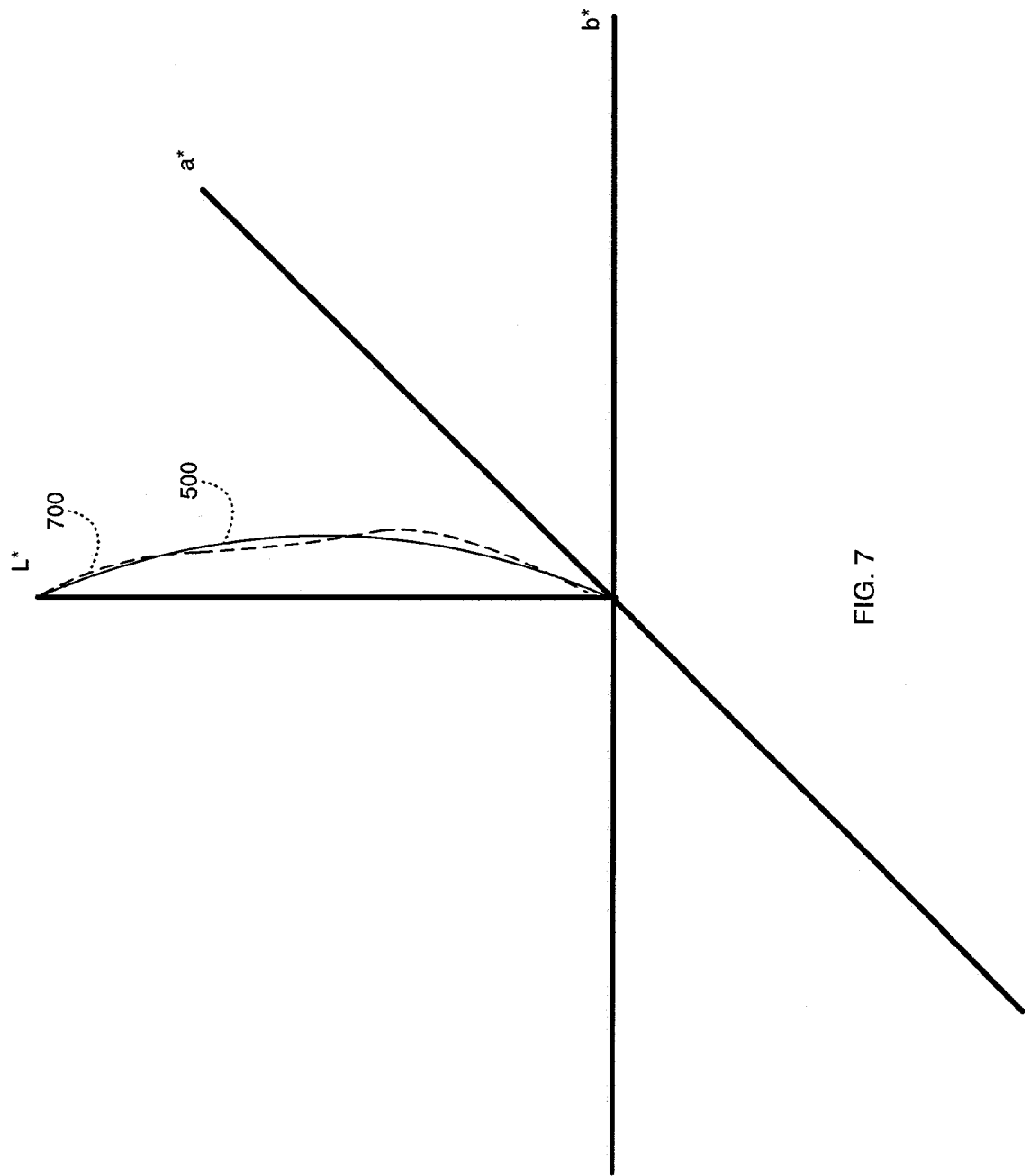

Shown in FIG. 7 is a representation of an exemplary variation around a color trajectory after application of an embodiment of the data adjustment method.

Figure 8:
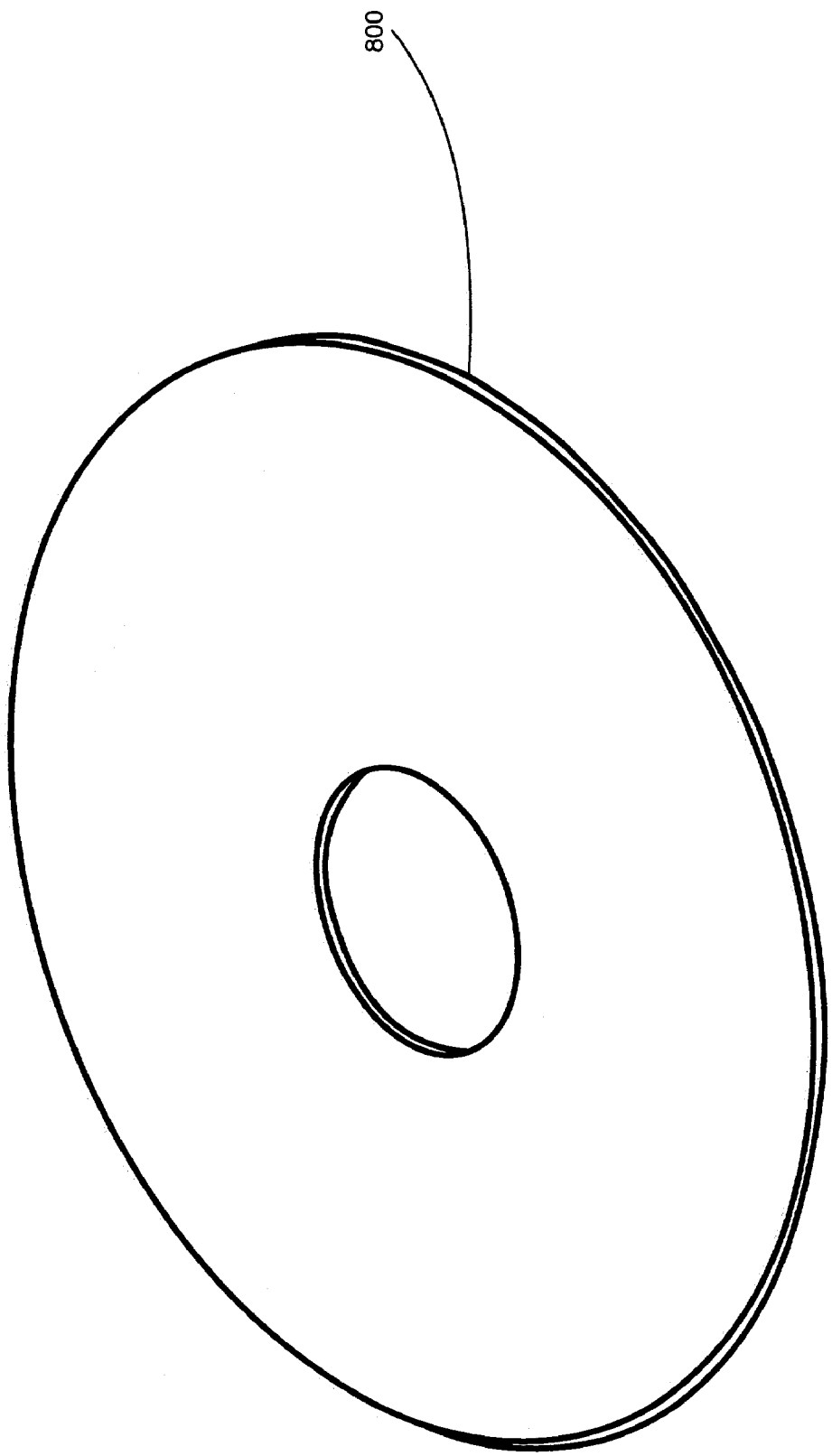

Shown in FIG. 8 is an embodiment of a storage device and an embodiment of a computer readable media.

DETAILED DESCRIPTION OF THE DRAWINGS

Although embodiments of the data adjustment system will be discussed in the context of an imaging device such as an inkjet printer, it should be recognized that embodiments of the data adjustment system could be used with other types of imaging devices, such as electrophotographic printers, copiers, facsimile machines or the like. In general, embodiments of the data adjustment system may be usefully applied to any type of imaging device that forms images by the placement of colorant onto media.

Shown in FIG. 1A is a high level block diagram of a first embodiment of an imaging system that can form images on media. The imaging system includes an embodiment of a data adjustment system that can be used to adjust values used in performing a color space conversion. Source device 100 corresponds to a system or device that can send data corresponding to an image that includes color over communication channel 102 to an embodiment of an imaging system, imaging system 104. Communication channel 102 could include a network, such as a local area network or a wide area network, or a wireless link. Source device 100 could include, for example, a computing device, such as a computer a portable computing device, server, wireless device, or the like, that executes an application program to generate data corresponding to an image or retrieves data corresponding to an image from a storage device. The application program may perform various operations upon the data generated or retrieved, such as image enhancement, prior to sending the data to imaging system 104. Using the data provided by source device 100, imaging device 106 includes a configuration to place colorant onto media corresponding to the data received from source device 100. In the embodiment of the data adjustment system included within imaging system 104, a computing device, such as computer 108, performs adjustment upon information used to perform a color space conversion to the color space used by imaging device 106.

The adjustment of the information is performed by an embodiment of the data adjustment method operating on computer 108. The information used in the color space conversion includes tables of values used to accomplish the color space conversion through interpolation. The color space conversion from the color space used by source device 100 to the color space used by imaging system 104 is accomplished by conversion to an intermediate color space from the source device color space and then conversion from the intermediate color space to the imaging device color space.

The tables of values used for conversion from the source device color space to the imaging device color space could be generated empirically or analytically so that the image formed on media by the imaging device matches the data used to form the image in the desired manner. Creation of the tables includes operations of color appearance adjustment, white/black point adaptation, gamut mapping, inverse interpolation, and color separation. The tables that result from these operations can be the source of errors in the color space conversion for data from the source device corresponding to colors that are in or around the gray region of the color gamut. The embodiment of the data adjustment system operates upon the information in the tables to reduce this error (and consequently improve the quality of the image formed on media) in or around the gray region of the color gamut.

Shown in FIG. 1B is a simplified block diagram of an embodiment of computer 108. An embodiment of a processing device, such as processor 110, is coupled to an embodiment of a memory device, memory 112. Processor 110 executes firmware or software retrieved from memory 112 to perform an embodiment of the data adjustment method. Memory 112 is used to store the information included within the tables used for color space conversion and upon which embodiments of the data adjustment method operate. Processor 110 could include, for example, a microprocessor or an ASIC.

Shown in FIG. 2A is a high level block diagram of a second embodiment of an imaging system that can form images on media. The imaging system includes an embodiment of a data adjustment system that can be used to adjust values used in performing a color space conversion. Source device 200 corresponds to a system or device that can send data corresponding to an image that includes color over communication channel 202 to an embodiment of an imaging system, imaging system 204. Source device 200 could include, for example, a computing device, such as a computer, a portable computing device, server, wireless device, or the like, that executes an application program to generate data corresponding to an image or retrieves data corresponding to an image from a storage device. The application program may perform various operations upon the data generated or retrieved, such as image enhancement, prior to sending the data to imaging system 204. Using the data provided by source device 200, imaging device 206 includes a configuration to place colorant onto media corresponding to the data received from source device 200. In the embodiment of the data adjustment system included within Imaging system 204, imaging device 206 performs adjustment upon information used to perform a color space conversion to the color space used by imaging device 206. As was the case for the embodiment of the data adjustment system included within imaging system 104, the embodiment of the data adjustment system included with imaging system 204 operates upon the information In the tables to reduce the error (and consequently improve the quality of the image formed on media) in or around the gray region of the color gamut.

Imaging device 206 may include a color inkjet printer or other types of printers such as an electrophotographic printer. Imaging device 206 includes the capability to form color images upon media using a set of colorants (such as ink or toner) forming a color space (e.g. cyan, magenta, and yellow and optionally black). Imaging device 206 may be configured to form images at 300 dpi, 600 dpi, 1200 dpi, or other resolutions. A printer driver program that can execute in source device 100 converts the data (corresponding to the image) received from the application program into a form useable by imaging device 206 such as a page description language (PDL) file. The PDL file may include for example a file defined in HEWLETT PACKARD'S PCL-3 or PCL-5 format.

Imaging device 206 renders the PDL file to generate pixel data including a color value for each pixel of each of the color planes forming the image. For example, an embodiment of imaging device 206 may generate color values for pixels forming the cyan, magenta, yellow, and black color planes. The color values for each of the pixels in the color planes may range, for example, from 0 to 255. A halftoning operation may be performed upon the color values of the color planes to generate halftone data for the image. The halftone data includes binary data specifying for each of the pixels in each of the color planes whether or not colorant for that color plane will be placed onto the pixel. Alternatively, the image may be formed using the color values for each of the pixels in each of the color planes without halftoning. For this alternative, the quantity of colorant placed onto the pixel is directly related to the color value for the pixel. For an inkjet printer, the quantity of the colorant is controlled by the number of drops of ink of a specific color placed onto the region of the media corresponding to the pixel. For an electrophotographic printer, the quantity of the colorant is controlled by the fractional portion of the region on the photoconductor corresponding to the pixel that is exposed and developed.

Shown in FIG. 2B is a simplified block diagram of an embodiment of imaging device 206. It should be recognized that the structure disclosed for the embodiment of imaging device 206 could be used in an embodiment of imaging device 106. Included in the embodiment of imaging device 206 is an embodiment of an image forming mechanism, imaging mechanism 208. Imaging mechanism 208 includes the hardware necessary to place colorant on media. For example, in the case of an electrophotographic printer, imaging mechanism 208 may include a photoconductor, developing devices for developing cyan, magenta, yellow, and black toner (the colorants in this embodiment of imaging mechanism 208), a photoconductor exposure system for forming a latent electrostatic image on the photoconductor, a charging device for charging the photoconductor, a transfer device for transferring toner from the photoconductor to media, and a fixing device for fixing toner to media.

An embodiment of a controller, such as controller 210, coupled to imaging mechanism 208 controls the placement of colorant onto media by imaging mechanism 208 making use of the halftone data or color values for the pixels forming each of the color planes. The output from the printer driver software executing in source device 100 is passed through interface 212 to controller 210. Controller 210 includes the capability to render the PDL file received from source device 100 to generate pixel data for each of the pixels forming the image. Controller 210 includes an embodiment of a processing device, such as processor 214 configured to execute firmware or software, or an application specific integrated circuit (ASIC) for controlling the placement of colorant onto media by imaging mechanism 208. In addition, controller 210 includes an embodiment of a memory device, such as memory 216 for storing halftone data or color values for the pixels forming the image.

Further detail on embodiments of imaging mechanisms used in color electrophotographic imaging devices can be found in U.S. Pat. No. 5,291,251, entitled IMAGE DEVELOPMENT AND TRANSFER APPARATUS WHICH UTILIZED AN INTERMEDIATE TRANSFER FILM, issued to Storlie et. al., and assigned to Hewlett-Packard Company, and U.S. Pat. No. 5,314,774, entitled METHOD AND APPARATUS FOR DEVELOPING COLOR IMAGES USING DRY TONERS AND AN INTERMEDIATE TRANSFER MEMBER, issued to Camis, and assigned to Hewlett-Packard Company. Each of these two patents is incorporated by reference in their entirety into this specification.

In the case of a color inkjet printer, imaging mechanism 208 may include ink cartridges movably mounted on a carriage with its position precisely controlled by a belt driven by a stepper motor. An ink cartridge driver circuit coupled to the controller and the ink cartridges fires nozzles in the ink cartridges based upon signals received from the controller to place colorant on media according to the halftone data or color values for the pixels forming each of the color planes. Further detail on embodiments of imaging mechanisms used in color inkjet printers can be found in U.S. Pat. No. 6,082,854, entitled MODULAR INK-JET HARD COPY APPARATUS AND METHODOLOGY, issued to Axtell et al., and assigned to Hewlett-Packard Company, and U.S. Pat. No. 5,399,039, entitled INK-JET PRINTER WITH PRECISE PRINT ZONE MEDIA CONTROL, issued to Giles et al., and assigned to Hewlett-Packard Company. Each of these two patents is incorporated by reference in their entirety into this specification.

The intermediate color space that forms the PCS could be, for example, an L*a*b* type color space, an XYZ color space, an L*u*v* type color space, or any other color space. Typically, a CIE L*a*b* color space is used for the PCS when the destination device includes a printer. Where the destination device includes a monitor, an XYZ color space could be used for the PCS. Although embodiments of the data adjustment system will be discussed in the context of the CIE L*a*b* color space, it should be recognized that other color spaces could be used. The color space for the source device and the color space for the destination device are frequently, respectively, an RGB color space (used for example to display images on a monitor) and a CMYK color space (used for example in an imaging device such as an electrophotographic printer or an inkjet printer). Although embodiments of the data adjustment system will be discussed in the context of an imaging device that operates in a CMYK color space, it should be recognized that the destination color space could include a wide variety of color spaces. For example, the destination color space could include an RGB color space, a CMY color space, a six colorant color space, a color space that uses light dye or pigment load colorants, or the like.

The conversion from the source device color space to the destination device color space can be performed to achieve different results in the image formed on media for the same set of data defining the image provided by the source device. Either automatically or through user selection, different rendering intents can be applied to the color space conversion. A separate table could be used for the color space conversion for each of the rendering intents. A rendering intent referred to as the perceptual rendering intent corresponds to a table used in the color space conversion that is developed to result in an image formed on the media that is more visually pleasing to an observer (on average) than would result through use of the other rendering intents. A rendering intent referred to as the colorimetric rendering intent corresponds to a table used in the color space conversion that is developed to result in an image formed on the media that has greater fidelity of color reproduction (as measured against the data defining the image) than would result through use of the other rendering intents. A rendering intent referred to as the saturation rendering intent corresponds to a table used in the color space conversion that is developed to result in an image formed on the media that has greater color saturation (i.e. more vivid colors) than would result through use of the other rendering intents.

In addition to designation of a rendering intent parameter for the color space conversion, there is also a parameter related to the color of the media. The color of the media upon which the image is formed will affect the perceptual and colorimetric properties of the image. For example, some media have a blue or yellow color component that will affect shift the colorimetric properties of the image formed onto the media. To compensate for the effects of the media color, the tables used for conversion for the source color space to the PCS are adjusted based upon a pre-selected media color. The effect of the adjustment is to substantially reduce the magnitude of the color shift that would have occurred without adjustment. Compensating for the color of the media is often called the white point adjustment or the white adaptation. Many color appearance models have been developed to predict the human visual adaptation to different white points. Examples are the Von Kries model, CIE LAB model, CIE CAM97S model, and CIE CAM2000 model.

The color space conversion process could be done in a variety of ways. A large look up table could be used to map every possible source device color space value to a corresponding color value in the intermediate color space and from the intermediate color space to the destination device color space. Alternatively, the color space conversion could be performed through a process of interpolation to and from the intermediate color space. Yet another alternative for performing color space conversion would involve computation of destination device color values from the source device color values. These alternatives could be mixed for performing the conversions to and from the intermediate color space.

Color space conversion through interpolation includes using the input color space value to access sets of values in a table. Where the color space conversion corresponds to a conversion from the L*a*b* color space (corresponding to the PCS) to the CMYK color space (the destination device color space), the interpolation can be regarded as determining a location within a cube having vertices defined by eight CMYK values in terms of a CMYK value accessed using an L*a*b* color value from the PCS. The location within the cube graphically represents the CMYK color value that corresponds to the L*a*b* color value received from the PCS. The CMYK color value that corresponds to the location within the cube is determined by calculating a weighting factor using the L*a*b* values corresponding to the CMYK values accessed in the table. The weighting factor is used, along with C, M, Y, and K color values accessed in the table with the L*a*b* color value received from the PCS, to compute each of the C, M, Y, and K components. The color space conversion operation from the PCS to the destination device color space can be performed in the imaging system within the imaging device or within a computing device, if included within the imaging system.

For color data provided from the source device as 24 bits per pixel data in an RGB color space, the table could include 4913 entries. This would correspond, graphically, to a cube having 17 points along each axis, where lines drawn perpendicular to each axis from the points defines a three dimensional grid. For this implementation, the increment in the color value for each of the components is 16 for 15 of the 16 intervals and 15 for one interval. The three axes represented correspond to, respectively, the R color component, G color component, and B color component. The points at which the lines intersect in space are referred to as grid points. At the grid points, the RGB color values corresponding to the grid points have directly corresponding values in the table of L*a*b* values. For RGB values off the grid points, an interpolation is performed to convert them to L*a*b* values. For conversion from the L*a*b* color space, used for the PCS, to the CMYK color space that could be used, for example, in the destination device, the axes correspond to the L* color component, the a* color component, and the b* color component. At the grid points, the L*a*b* color values correspond directly to CMYK values. For L*a*b* values off the grid points, an interpolation is performed to convert them to CMYK values.

The color space conversion from the color space used for the PCS (for example the L*a*b* color space) to the color space used by the destination device (for example the CMYK color space) introduces errors into the result from the interpolation process and inaccuracies in the values in the tables used for the color space conversion. These errors can be present throughout the color space. Another possible source of error in the color of the reproduced image comes from variability in the placement of colorant onto the media. For example, in an inkjet imaging device, a quantity of the colorants placed onto the media corresponding to a particular color value may vary between imaging devices because of variability in construction and within an imaging device because of variations in temperature and changes in the imaging device over time.

Color values in the L*a*b* color space on or around the L* axis correspond to a range of gray tones. As previously mentioned, the human eye is very sensitive to variations in color within the range of gray tones. Consider the case in which it is desired to create a region on media, through the placement of the primary colorants of the colorant system used, that is of neutral gray (i.e. in the L*a*b* color space, the color of the region always lies upon the L* axis) and there is a variation in the L* value of the region from 0 to 255. Shown in FIG. 3 is curve 300, representing the trajectory the color of the region might take as the image device attempts to vary the L* value from 0 to 255. Errors, including errors contributed by the color space conversion process and errors from variation in the quantities of colorant the imaging device places onto the media, cause deviation from the L* axis.

By applying an embodiment of the data adjustment method to the tables used in the color space conversion, the magnitude of the variation off the L* axis can be reduced. Shown in FIG. 4 is curve 400 which could represent the trajectory of the color for the region with an embodiment of the data adjustment method applied to the values in the tables. As can be seen by comparing curve 300 and curve 400, the magnitude of the variation off the L* axis is reduced by applying an embodiment of the data adjustment method.

As previously mentioned, certain observers may prefer that regions that would be classified as gray actually have a systematic shift in color off the L* axis. Some observers prefer a shift in the blue direction for regions that would be classified as gray. Shown in FIG. 5 is curve 500 that shows a representative desired shift off the L* axis. An embodiment of the data adjustment method could be applied to the values in the tables used for conversion from the intermediate color space of the PCS to generate the type of trajectory in the color shown in FIG. 5 when the color values in the intermediate color space lie along the L* axis.

Shown in FIG. 6 is a high level flow diagram of a first embodiment of the data adjustment method. In step 600, an L* value corresponding to a grid point on the L* axis is selected from the set of grid points on the L* axis. Next, in step 602, the corresponding CMYK value is selected from the table used for conversion from the L*a*b* color space to the CMYK color space. Then, in step 604, a color space conversion is performed from the CMYK color space to the L*a*b* color space, on the CMYK value selected in step 602, with a table used for interpolation from the CMYK color space to the L*a*b* color space. If the table used for the color space conversion from the CMYK color space to the L*a*b* color space includes adjustments to compensate for the media color, the values in the table are adjusted to undo the effects of the white point adjustment so that there is colorimetric accuracy. The table used for the interpolation corresponds to a colorimetric rendering intent to improve the colorimetric accuracy in the color space conversion between the CMYK color space for the destination device and the L*a*b* color space included in the PCS.

Next, in step 606, a parameter is determined that relates to the distance of the CMYK color value from the grid point selected in step 600. One way in which this parameter could be determined is by forming a sum of the squares of the a* and b* values, computed in the color space conversion of the CMYK color value corresponding to the grid point on the L* axis to the L*a*b* value, and adding this to the square of the difference between the L* value of the selected grid point and the L* value resulting from conversion of the CMYK color value to the L*a*b* color space. Another way in which the parameter could be determined is from the square root of the sum of the squares of the three values mentioned in the previous sentence. Yet another way the parameter could be determined involves computing several trigonometry relationships. By computing an inverse tangent of a ratio of the magnitude of the a* value and the magnitude of the b* value and then a cosine of the inverse tangent a perpendicular distance to the L* axis is determined. By applying this same relationship again, using the previously mentioned difference between the L* values and the perpendicular distance to the L* axis the parameter could be determined. Yet another way to determine the parameter includes forming a sum of the a* value, b* value and the difference between the L* values. Then, in step 608, the parameter is compared to a predetermined value to determine whether the magnitude of the parameter is less than the predetermined value. The magnitude of the predetermined value is selected, so that after the embodiment of the data adjustment method is performed, the CMYK color values generated from the conversion of the L*a*b* color values are located within a desired distance of the grid point on the L* axis. It should be recognized that the predetermined value may not correspond directly to a distance from the grid point on the L* axis.

Next, in step 610, if the parameter equals or exceeds the predetermined value, an adjustment is performed upon the CMY color value. Then, control is returned to step 606. If the parameter is less than the predetermined value, then, in step 612, the C,M, and Y values for the grid point under adjustment are updated with their adjusted values. Next, in step 614, the embodiment of the data adjustment system determines if all the grid points in the table for conversion to the CMYK color space (corresponding to grid points on the L* axis) have been adjusted. If all the grid points have not been adjusted, control is returned to step 600. If all of the grid points have been adjusted, the method is ended in step 616.

The adjustment performed in step 610 is directed toward reducing the distance from the grid point on the L* axis to the location of the L*a*b value resulting from color space conversion of the CMYK color value. A variety of techniques could be used to reach a CMY color value in the adjustment that is less than the predetermined value. One way in which the adjustment could proceed is to iteratively adjust each of the C, M, and Y values, within a range of values around the L* axis, through a series of nested loops. That is, for example, vary the Y value through the range within the CMYK color space while holding the C value and the M value constant. Then, vary the M value by one increment. Then, again vary the Y value through the range within the CMYK color space while holding the C value and the M value constant. Repeat this process until the M value has gone through its entire range and then vary the C value by one increment. Then, repeat this process until the C value has been varied through its range. Shown below is pseudo code that represents this adjustment process.

```
For C from C-ΔC To C+ΔC
{
    For M from M-ΔM To M+ΔM
    {
        For Y from Y-ΔY To Y+ΔY
        {
```

As an alternative to stopping the adjustment process, for a particular set of CMY values, when the parameter is first determined to be less than the predetermined value, an embodiment of the data adjustment method could perform the adjustment through the entire range of C, M, and Y values until the parameter is at a value corresponding to a minimum distance from the selected grid point on the L* axis. The advantage in this alternative would be that the resulting table of values used for the conversion from the L*a*b* color space, forming the PCS, to the CMYK color space would, at least in one sense, be optimally adjusted for reproducing colors on or around the L* axis.

It should be recognized that there are a variety of adjustment techniques that could be used for step 610. An alternative adjustment technique could include changing the order in which the C, M, and Y values are changed according to which of the color values has the largest influence on the color. Another alternative could include changing the C, M, and Y values on each of successive passes of the adjustment.

Embodiments of the data adjustment method may be used to adjust the CMY data to follow a color trajectory off the L* axis when color values on the L* axis are converted to the destination color space. Shown in FIG. 5 is an example of a color trajectory that could be used as the target profile. Curve 500 represents a possible color trajectory that could be targeted. As can be seen from FIG. 5, curve 500 corresponds to a shift toward the blue portion of the L*a*b* portion of the color space. Curve 502 represents a possible color trajectory that might result without application of an embodiment of the data adjustment method. Shown in FIG. 7 is a color trajectory that could possibly result from application of an embodiment of the data adjustment method. As can be seen by comparing the deviation of curve 502 and curve 700 from curve 500, application of an embodiment of the data adjustment method improves conformance between the desired color and the actual color that results from the color space conversion from color values on the L* axis.

A second embodiment of the data adjustment method operates to convert L*a*b* values on the L* axis from the PCS to values in the CMYK color space that are off the L* axis, such as is represented by curve 700. The second embodiment of the data adjustment method operates similarly to the first embodiment of the data adjustment method except for the determination of the parameter and adjustment of the CMY values. For this second embodiment of the data adjustment method, the desired offset from the L* axis changes as a function of the position along the L* axis of the L*a*b* value converted to the CMYK color space. The offset from the L* axis corresponds to non-zero values for a* and b*. For the color trajectory as represented in curve 500, the offset from the L* axis for the L* value equal to 0 and equal to 255 is 0. Between these extremes of the L* value, the offset from the L* axis is non-zero. It should be recognized that the second embodiment of the data adjustment method could be used to adjust the tables used for conversion to match a color trajectory of arbitrary shape.

The a* and b* values corresponding to the color trajectory of curve 500 will be designated as a*(L*) and b*(L*) to indicate that these values are a function of the L* value. In one way to determine the parameter for the second embodiment of the data adjustment method, the a*(L*) value is subtracted from the a* value computed from the color space conversion, the result of the subtraction is squared, the b*(L*) value is subtracted from the b* value, the result of the subtraction is squared, the squared values are summed, and added to this sum is the square of the difference between the L* value of the selected grid point and the L* value resulting from conversion of the CMYK color value to the L*a*b* color space. The computation of this parameter corresponds, in the second embodiment of the data adjustment method, to step 606 in the first embodiment of the data adjustment method. As was the case for the first embodiment of the data adjustment method, there are a variety of ways to determine a parameter that is related to the distance between the desired color value (after conversion from the CMYK value corresponding to a grid point L*a*b* color value) and the target color value in the L*a*b* color space.

The adjustment of the CMY values in the second embodiment of the data adjustment method is similar to that done in step 610 of the first embodiment of the data adjustment method. However, at least one difference in the methods is that the range over which one or more of the C, M, or Y values would be adjusted may be different because the target color (for example curve 500) is different. Because the target color is offset from the L* axis (in some locations), the adjustment range used for the C, M, and Y values would be different so that the color space conversion from values on the L* axis, in the L*a*b* color space, to the CMYK color space comes within the desired distance of the target color. Furthermore, the adjustment range used for the C, M, and Y values could be changed as a function of the location along the L* axis. This would reduce the time required to complete the adjustment of the values in the table over that required for a wider adjustment range which does not vary as a function of the L* value.

Embodiments of the data adjustment method have been discussed in the context of an L*a*b* color space (for the PCS) and a CMYK color space for the destination device color space. However, it should be recognized that the methods disclosed in the first and the second embodiments of the data adjustment method are applicable for adjustment of the tables used for interpolation for other types of color spaces included in the PCS and used for the destination device. Consider the case in which the color space included within the PCS is an XYZ color space and the destination device color space is an RGB color space. In this case, the XYZ color values that lie upon the L* axis, most likely do not correspond to grid points. Therefore, the color space conversion from the XYZ color values that lie upon the L* axis to the correspond RGB values will likely include an interpolation. As a result, when the adjustment is done to the tables used for conversion from the XYZ color space to the RGB color space so that the XYZ color values on the L* axis are converted to the desired color in the RGB color space, multiple sets of values in the tables will be adjusted to accomplish this. This occurs because, unlike the case in which grid points were involved (for which there were corresponding sets of values between the color spaces), when an interpolation is performed in the color space conversion multiple sets of values in the tables must be used.

Processor executable instructions used to perform an embodiment of the data adjustment method can be stored on an embodiment of a storage device. The embodiment of the storage device could include an embodiment of a computer readable medium. The computer readable medium could include a medium readable electrically, optically, magnetically or electromagnetically. An embodiment of the computer readable medium could include a compact disc (CD), a floppy disk, a disk platter within a hard disk drive, or a magnetic tape within a magnetic tape drive. Shown in FIG. 8 is an embodiment of a computer readable medium including compact disk 800 having an embodiment of the data adjustment method stored. Alternatively, the embodiment of the computer readable medium could include semiconductor memory. Embodiments of the data adjustment method could be distributed by physically delivering the computer readable memory to the end user or by allowing a user to download the program from a storage device, such as a hard disk drive, through a wide area network or a local area network.

Although several embodiments of the data adjustment system and method have been illustrated and described, it is readily apparent to those of ordinary skill in the art that various modifications may be made to these embodiments without departing from the scope of the appended claims.

What is claimed is:

1. A method, comprising:
obtaining a value corresponding to a first location on the a neutral gray axis, corresponding to a luminance axis of a L*a*b* color space, in a first color space; and
changing the value to correspond to a second location off of the neutral gray axis and within a distance of a curve that intersects the neutral gray axis at a minimum L* value and a maximum L* value, wherein the maximum L* value is different from the minimum L* value, and does not intersect the neutral gray axis at L* values other than the minimum L* value and the maximum L* value.

2. The method as recited in claim 1, wherein:
the minimum L* value corresoonds to 0; and
the maximum L* value corresponds to 255.

3. The method as recited in claim 1, further comprising:
with the value corresponding to a first value, converting the first value, corresponding to the second location, to a second value in a second color space.

4. The method as recited in claim 3, wherein:
obtaining the first value includes selecting the first value from the first plurality of values corresponding to a plurality of positions upon the neutral gray axis.

5. The method as recited in claim 4, wherein:
the first color space corresponds to a L*a*b* color space;
the second color space corresponds to a CMYK color space; and
at least a portion of the curve exists off the neutral gray axis along a b* axis at the L*a*b* color space.

6. The method as recited in claim 3, wherein:
the first color space corresponds to a L*a*b* color space;
the second color space corresponds to a CMYK color space;
the obtaining the first value includes selecting the first value having a first L* component, a first a* component, and a first b* component;
the changing the first value includes adjusting the first L* component, adjusting the first a* component, and adjusting the first b* component to form, respectively, a second L* component, a second a* component, and a second b* component; and
the converting the first value to the second value includes determining a C component, an M component, a Y component, and a K component using the second L* component, the second a* component, and the second b* component.

7. The method as recited in claims 6, further comprising:
determining a third value related to a distance between the second location and the curve by adding a square of a difference between the second a* component and an a* component on the curve a square of a difference between the second b* component and a b* component on the curve.

8. The method as recited in claim 2, wherein:
the curve extends off the neutral gmy axis along a b* axis.

9. The method as recited in claim 1. wherein:
a computing device performs the obtaining the value and the changing the value.

10. The method as recited in claim 1, wherein:
an imaging device performs the obtaining the value, and the changing the value.

11. An apparatus, comprising:
a memory configured to store a first set of values corresponding to a first location on a neutral gray axis, corresponding to a luminance axis of a L*a*b* color space, and associated with a first color space; and
a processing device operatively associated with the memory and configured to change the first set of values to a second set of values that correspond to a second location off of the neutral gray axis and within a distance of a curve that intersects the neutralgray axis at a minimum L* value and a maximum L* value, wherein the maximum L* value is different from the minimum L* value, and does not intersect the neutral gray axis at L* values other than the minimum L* value and the maximum L* value.

12. The apparatus as recited in claim 11, wherein:
the minimum L* value corresponds to; and the maximum L* value corresponds to 255.

13. The apparatus as recited in claim 12, wherein:
the curve extends off the neutral gray axis along a b* axis.

14. The apparatus as recited in claim 11, wherein:
the processing device includes a configuration to determine a third value related to a distance between the second location and the curve; and
the processing device includes a configuration to change the second set of values corresponding to the second location using the third value to reduce a magnitude of the distance.

15. The apparatus as recited in claim 14, wherein:
the first color space corresponds to a L*a*b* color space.

16. The apparatus as recited in claim 15, wherein:
the first set of values includes a first L* value, and a first a* value, and a first b* value;
the second set of values includes, a second L* value, a second a* value, and a second b* value; and
the processing device includes a configuration to determine the third value using a sum of a square of a difference between the second a* value and an a* value on the curve, and a sum of a square of a difference between the second b* value and a b* value on the curve.

17. The apparatus as recited in claim 16, wherein: the processing device includes a processor.

18. The apparatus as recited in claim 15, wherein:
the processing device includes a configuration to convert the second set of values to a second color space.

19. The apparatus as recited In claim 18, wherein:
the second color space includes a CMYK color space.

20. The apparatus as recited in claim 19, wherein:
the memory includes a configuration to store a table for converting between the first color space and the second color space; and
the processing device includes a configuration to replace the first set of values with the second set of values in the table.

21. An apparatus, comprising:
means for storing a first value in a first color space and corresponding to a first location on a neutral gray axis, corresponding to a luminance axis of a L*a*b* color space; and
means for processing operatively associated with the means for storing and far determining a second value, corresponding to a second location off the neutral gray axis and within a distance of a curve that intersects the neutral gray axis at a minimum L* value and a maximum V value, wherein the maximum L* value is different from the minimum L* value, and does not intersect the neutral gray axis at L* values other than the minimum L* value and the maximum L* value.

22. An imaging device, comprising:
an interface arranged to receive data from a computing device;
a memory configured to store image data and a first interpolation table;
a processing device coupled to the memory and configured to generate the image data using the data, configured to select a first value corresponding to a first grid point on a luminance axis in a first color space from the first interpolation table, configured to change the first value to a second value corresponding to a location off of the luminance axis and within a predetermined distance of a curve that intersects the neutral gray axis at minimum L* value and a maximum L* value, wherein the maximum L* value is different from the minimum L* value, and does not intersect the neutral gray axis at L* values other than the minimum L* value and the maximum L* value; and
an imaging mechanism configured to form an image on media corresponding to the image data.

23. The imaging device as recited in claim 22, wherein: the first color space includes a L*a*b* color space.

24. The imaging device as recited in claim 23, wherein:
the second value includes a first L value, a first a* value, and a first b* value;
the processing device includes a configuration to determine a distance using a sum of a square of a difference between the first a* value and an a* value on the curve, and a square of a difference between the first b* value and a b* value on the curve.

25. The imaging device as recited in claim 22, wherein:
the memory includes a configuration to store a second interpolation table; and
the processing device includes a configuration to perform a color space transform on the second value to a CMYK color space to determine a third value and a configuration to replace a value in the second interpolation table corresponding to the first value with the third value.

26. An imaging system, comprising:
an imaging device including a memory configured to store image data, a first interpolation table, a second interpolation table, and an imaging mechanism configured to form an image on media corresponding to the image data; and
a computing device coupled to the imaging device and including a processing device configured to generate the image data using the data, configured to select a first value corresponding to a first grid point on a luminance axis in a first color space from the first interpolation table, configured to change the first value to a second value corresponding to a location off of the luminance axis and within a predetermined distance of a curve that intersects the neutral gray axis at a minimum L* value and a maximum L* value, wherein the maximum L* value is different from the minimum L* value, and does not intersect the neutral gray axis at L* values other than the minimum L* value and the maximum L* value, configured to perform a color space conversion of the second value to a third value corresponding to a location in the second color space using the second interpolation table and configured to update the second interpolation table using the third value.

27. The imaging system as recited in claim 26, wherein:
the first color space includes a L*a*b* color space; and
the second color space includes a CMYK color space.

28. The imaging system as recited in claim 27, wherein:
the first value includes a first L* value, a first a* value, and a first b* value;
the second value includes a second L* value, a second a* value, and a second b* value; and
the processing device includes a configuration to determine a distance using a sum of a square of a difference between the second a* value and an a* value on the curve, and a square of a difference between the second b* value and a b* value on the curve.

29. The imaging system as recited in claim 28, wherein:
at least a portion of the curve exists off the neutral gray axis along a b* axis of the L*a*b* color space.

30. A computer readable medium storing processor executable instructions configured to obtain a first value corresponding to a first location, on a neutral gray axis corresponding to a luminance axis of a L*a*b* color space, in a first color space, to change the first value to a second value corresponding to a second location off of the neutral gray axis and within a distance of a curve that intersects the neutral gray axis at a minimum L* value and a maximum L* value, wherein the maximum L* value is different from the minimum L* value, and does not intersect the neutral gray axis at L* values other than the minimum L* value and the maximum L* value, and to convert the second value to a third value in a second color space corresponding to the second location in the first color space.

31. The computer readable medium as recited in claim 30, wherein:
the first location corresponds to a position on a neutral gray axis in the first color space.

32. The computer readable medium as recited in claim 30, wherein:
the processor executable instructions configured to obtain the first value include a configuration to select the first value from the first plurality of values including a plurality of positions upon the neutral gray axis:
the first color space corresponds to a L*a*b* color space; and
the second color space corresponds to a CMYK color space.

33. The computer readable medium as recited in claim 30, wherein:
the processor executable instructions configured to select the first value include a configuration to select the first value having a first L* component, a first a* component, and a first b* component; and
the processor executable instructions configured to change the first value to the second value include a configuration to determine a second L* component, a second a* component, and a second b* component.

34. The computer readable medium as recited in claim 33, wherein:
the processor executable instructions include a configuration to determine a value related to a distance using a square of a difference between the second a* component and an a* component on the curve, and a square of a difference between the second b* component and a b* component on the curve.

35. The computer readable medium as recited in claim 30, wherein:
the minimum L* value corresponds to 0 and the maximum L* value corresponds to 255.

36. The computer readable medium as recited in claim 32 wherein:
at least a portion of the curve exists off the neutral gray axis along a b* axis of the L*a*b* color space.

* * * * *

UNITED STATES PATENT AND TRADEMARK OFFICE
CERTIFICATE OF CORRECTION

PATENT NO.         : 7,304,766 B2
APPLICATION NO. : 10/114648
DATED                   : December 4, 2007
INVENTOR(S)        : Huanzhao Zeng It is certified that error appears in the above-identified patent and that said Letters Patent is hereby corrected as shown below:

In column 11, line 19, in Claim 1, after "location on" delete "the".

In column 11, line 31, in Claim 2, delete "corresoonds" and insert -- corresponds --, therefor.

In column 11, line 42, in Claim 5, delete "claim 4" and insert -- claim 3 --, therefor.

In column 11, line 47, in Claim 5, after "axis" delete "at" and insert -- of --, therefor.

In column 11, line 65, in Claim 7, delete "claims" and insert -- claim --, therefor.

In column 12, line 6, in Claim 8, delete "gmy" and insert -- gray --, therefor.

In column 12, line 7, in Claim 9, after "claim 1" delete "." and insert -- , --, therefor.

In column 12, line 22, in Claim 11, delete "neutralgray" and insert -- neutral gray --, therefor.

In column 12, line 29, in Claim 12, delete "to;" and insert -- to 0; --, therefor.

In column 12, line 44, in Claim 16, after "value," delete "and".

In column 12, line 46, in Claim 16, after "includes" delete ",".

In column 12, line 59, in Claim 19, after "recited" delete "In" and insert -- in --, therefor.

In column 13, line 7, in Claim 21, delete "far" and insert -- for --, therefor.

In column 13, line 11, in Claim 21, delete "V" and insert -- L* --, therefor.

In column 13, line 28, in Claim 22, after "at" insert -- a --.

In column 13, line 38, in Claim 24, delete "L" and insert -- L* --, therefor.

In column 15, line 8, in Claim 34, after "curve" delete ",".

UNITED STATES PATENT AND TRADEMARK OFFICE
CERTIFICATE OF CORRECTION

PATENT NO. : 7,304,766 B2
APPLICATION NO. : 10/114648
DATED : December 4, 2007
INVENTOR(S) : Huanzhao Zeng It is certified that error appears in the above-identified patent and that said Letters Patent is hereby corrected as shown below:

In column 16, line 5, in Claim 36, after "claim 32" insert -- , --.

Signed and Sealed this

Fifth Day of August, 2008

JON W. DUDAS
*Director of the United States Patent and Trademark Office*